United States Patent [19]

Kaes et al.

[11] 3,930,873
[45] Jan. 6, 1976

[54] RADIO-PHOTOLUMINESCENCE DOSIMETER GLASS OF LOW ENERGY DEPENDENCE AND METHOD OF MANUFACTURING SAME

[75] Inventors: Hans-Herbert Kaes, Wetzlar-Dorlar; Hans Staaden, Stockhausen, both of Germany

[73] Assignee: Ernst Leitz G.m.b.H., Wetzlar, Germany

[22] Filed: July 23, 1973

[21] Appl. No.: 381,775

[30] Foreign Application Priority Data
July 24, 1972 Germany............................ 2236302

[52] U.S. Cl................................. 106/47 R; 252/301.4
[51] Int. Cl................................................. C03c 3/16
[58] Field of Search.............. 252/301.4; 106/47 R; 250/83, 83.1

[56] References Cited
UNITED STATES PATENTS

| | | |
|---|---|---|
| 3,208,860 | 9/1965 | Armistead et al. ..................... 106/54 |
| 3,449,136 | 6/1969 | Carpentier et al. ................. 106/47 R |
| 3,554,920 | 1/1971 | Becker............................ 252/301.4 |
| 3,740,241 | 6/1973 | Bromer et al. ..................... 106/47 R |

Primary Examiner—Winston A. Douglas
Assistant Examiner—John F. Niebling
Attorney, Agent, or Firm—Erich M. H. Radde

[57] ABSTRACT

A radio-photoluminescence dosimeter glass of low energy dependence, high sensitivity, and good resistance to weathering is composed of an activating silver compound such as silver metaphosphate and at least one metal fluoride, preferably of metals of groups I, II, III, and/or IV of the Periodic System. Such a glass may contain at least one further metal oxide, preferably an oxide of metals of groups I, II, and/or III of the periodic System, phosphorus pentoxide, and, if desired, nitrogen pentoxide.

28 Claims, 11 Drawing Figures

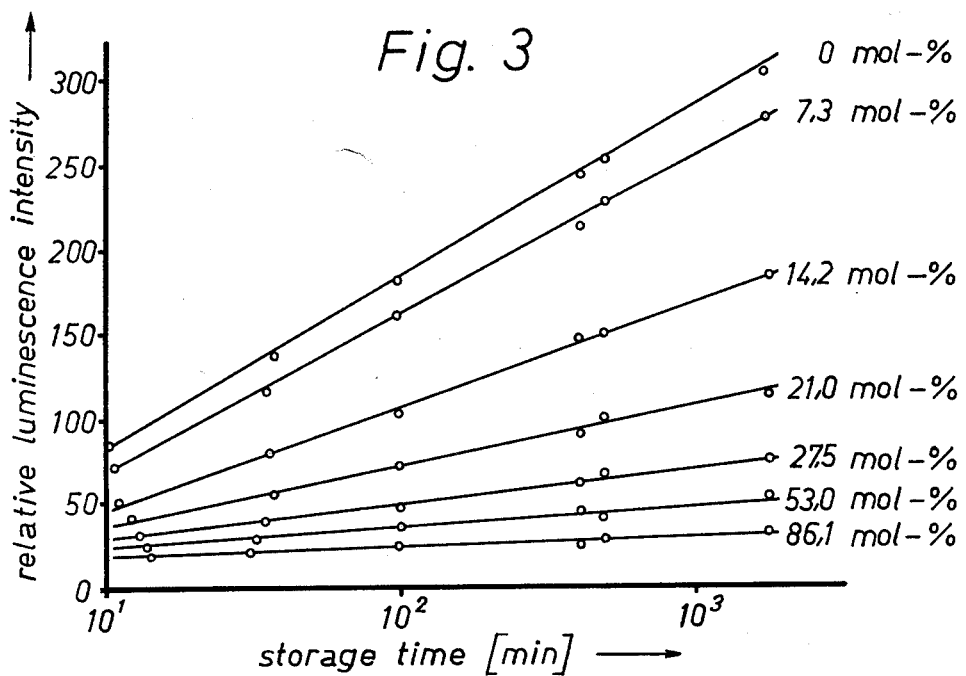
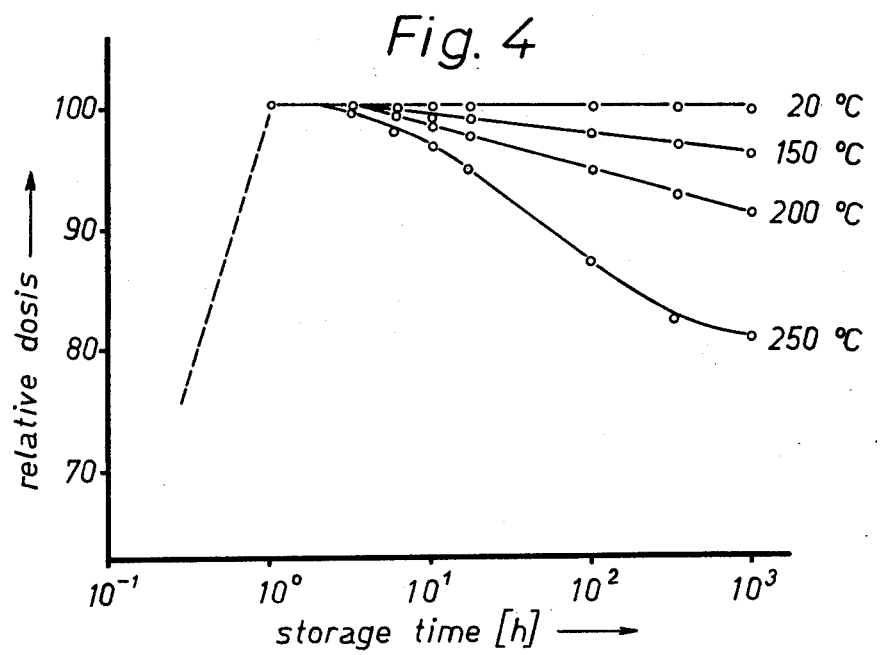

RADIO-PHOTOLUMINESCENCE DOSIMETER GLASS OF LOW ENERGY DEPENDENCE AND METHOD OF MANUFACTURING SAME

BACKGROUND OF THE INVENTION

1. Field of the Invention

The present invention relates to a radio-photoluminescence glass useful in dosimetry, hereinafter designated as "RPL dosimeter glass", of low energy dependence, and to a method of manufacturing same.

2. Description of the Prior Art

The dose indication of the RPL glasses possesses within the γ-energy range between 40 keV and 60 keV a maximum of the energy dependence. This is rather disturbing when using the glass in dosimetry. Its suppression necessitates considerable additional expenditures for the encapsulation and mounting of such glasses, leading to a great increase in cost, an undesired increase in weight, and difficulties in cleaning the glasses. For this reason attempts have been made to reduce the quota of photo-electrons causing said maximum of the energy dependence by developing dosimeter glasses of a low mean nuclear charge number or atomic number.

Thus replacing barium metaphosphate $Ba(PO_3)_2$ which has a high nuclear charge number by magnesium metaphosphate $Mg(PO_3)_2$ is described in the journal "Nucleonics" vol. 18 (1960), pages 94 and 95. U.S. Pat. No. 3,554,920 discloses special glasses based on lithium metaphosphate $LiPO_3$ and a lithium borate of the formula $Li_2O. 4 B_2O_3$. However, the use of said special glasses in practice is prevented by their having too low a resistance to weathering.

Despite the small proportion of activating silver in the overall composition of RPL dosimeter glasses, this low silver content, because of its high nuclear charge number, decisively affects the energy dependence in basic glass compositions consisting otherwise of light chemical elements or compounds.

Thus it is known from "Health Physics" vol. 20 (1971), pages 662 and 663, to decrease the silver content of a dosimeter glass bearing the designation "Toshiba FD-3" while otherwise the basic glass composition in only slightly modified. Such a decrease in the amount of activator, however, results in a low sensitivity.

It is to be pointed out in particular that with the exception of the above-mentioned lithium borate glass of the formula $Li_2O.4 B_2O_3$ the basic glass composition of all RPL glasses known at present is based on metaphosphates. Examples of such dosimeter glasses with metaphosphates as glass former are described, for instance, in German Application No. 1,596,750 published for opposition, German provisionally Published Application No. 1,621,004, and Austrian Pat. No. 257,858.

In such glasses the metaphosphate can partly be replaced by oxides, at least to a limited extent as this is described in the journal "Glastechnische Berichte" vol. 45, (1972), No. 6, pages 234 to 238. However, such a replacement results also in a reduction in sensitivity. Development of RPL glasses useful in dosimetry and being based on silica was also unsuccessful due to the low solubility of silver in silicates — as follows from the "Journal of the Electrochemical Society" vol. 95 (1949), pages 70 to 79.

Silver-activated borate glasses have too low a weathering resistance and — as compared with metaphosphate glass compositions — too low a sensitivity.

Thus it appears not very promising further to develop RPL dosimeter glasses based on borate or silicate.

The aforesaid publications show that the efforts of those skilled in the art to produce RPL dosimeter glasses having a low energy dependence and at the same time further desirable properties such as high sensitivity, absence of fading at room temperature, and good resistance to weathering, up to now have not found any fully satisfactory solution, although such efforts have been continued extensively.

SUMMARY OF THE INVENTION

It is one object of the present invention to provide RPL dosimeter glasses of low energy dependence, high sensitivity, and good resistance to weathering, which glasses are free of the disadvantages of the known dosimeter glasses.

Another object of the present invention is to provide a simple and effective process of making such RPL dosimeter glasses.

Still another object of the present invention is to use such glasses in radio-photoluminescence dosimetry.

Other objects of the present invention and advantageous features thereof will become apparent as the description proceeds.

In principle these objects are achieved in accordance with the present invention by replacing the metaphosphate in metaphosphate glasses by fluorine. As a result thereof, with the same cations, the mean nuclear charge number and thus the energy dependence of the glass decreases. Thus by suitable selection of cations, it was possible to achieve glass formation for predominantly metaphosphate glasses, for fluorophosphate glasses and for pure fluoride glasses.

The glasses of the present invention are characterized by the feature that they consist of a silver compound and at least one fluoride.

The fluorides may be simple and/or complex inorganic fluorides of metals of the first to fourth groups of the Periodic System. The glass may contain, in addition thereto, at least one other oxide of a metal of the first to third groups of the Periodic System, furthermore, additionally phosphorus pentoxide and also nitrogen pentoxide. A dosimeter glass in accordance with the present invention may preferably consist of 0.0001 to 15.0 %, by weight, of silver oxide $Ag_2O$ and a corresponding weight equivalent proportion of phosphorus pentoxide $P_2O_5$ calculated for the chemical compound $AgPO_3$, as well as of one or more fluorides in an amount sufficient to make up the glass composition to 100 %, by weight.

According to preferred embodiments of the present invention the glass may consist advantageously of 0.001 to 10.0 %, by weight, of silver oxide $Ag_2O$ or of 0.01 to 2.0 %, by weight, of silver oxide $Ag_2O$ and corresponding weight equivalent amounts of phosphorus pentoxide $P_2O_5$ calculated to yield the chemical compound silver metaphosphate $AgPO_3$, as well as amounts of one or more fluorides to make up the glass composition to 100 %, by weight.

According to a further embodiment of the present invention, the glasses may contain 2.0 to 25.0 %, by weight, of one or more metal oxides and 15.0 to 80.0 %, by weight, of phosphorus pentoxide $P_2O_5$. In addition thereto, 0.5 to 5.0 %, by weight, of nitrogen pentoxide $N_2O_5$ may be present.

Other advantageous glasses in accordance with the present invention may consist of 0.02 to 2.0 %, by weight, of silver oxide $Ag_2O$, 0.01 to 1.0 %, by weight, of phosphorus pentoxide $P_2O_5$, and 5.0 to 99.5 %, by weight, of at least one fluoride, whereby there may be present in addition to the above components 5.0 to 25.0 %, by weight, of at least one metal oxide and up to 77.0 %, by weight, of phosphorus pentoxide $P_2O_5$ and furthermore 1.0 to 2.0 %, by weight of nitrogen pentoxide $N_2O_5$. Glasses of the present invention may further contain up to 10.0 %, by weight, of at least one monovalent metal oxide and/or up to 22.0 %, by weight, of at least one bivalent metal oxide and/or up to 10.0 %, by weight, of at least one trivalent metal oxide. Thus, for instance, up to 1.0 %, by weight, of sodium oxide $Na_2O$ and/or up to 9.0 %, by weight, of lithium oxide $Li_2O$, up to 3.0 %, by weight, of magnesium oxide MgO, and up to 4.0 %, by weight, of calcium oxide CaO, or up to 22.0 %, by weight, of barium oxide BaO and up to 10.0 %, by weight, of aluminum oxide $Al_2O_3$ may be present.

The glasses of the present invention may contain, furthermore, up to 50.0 %, by weight, of at least one monovalent metal fluoride and/or up to 65.0 %, by weight, of at least one bivalent metal fluoride and/or up to 35.0 %, by weight, of at least one trivalent metal fluoride. Thus, for instance, up to 49.0 %, by weight, of lithium fluoride LiF and/or up to 5.0 %, by weight, of potassium fluoride KF, up to 10.0 %, by weight, of beryllium fluoride $BeF_2$ or up to 10.0 %, by weight, of magnesium fluoride $MgF_2$ and/or up to 32.0 %, by weight, of calcium fluoride $CaF_2$ and/or up to 12.0 %, by weight, of strontium fluoride $SrF_2$ and/or up to 15.0 %, by weight, of barium fluoride $BaF_2$ and up to 6.0 %, by weight, of lanthanum fluoride $LaF_3$ and/or up to 31.0 %, by weight, of aluminum fluoride $AlF_3$ may be present.

The process of producing an RPL glass according to the present invention is characterized by the feature that the glass is melted down from a mixture which consists of at least one fluoride and a silver compound.

The silver compound may be silver metaphosphate ($AgPO_3$), silver nitrate ($AgNO_3$), silver carbonate ($Ag_2CO_3$), or silver lithium metaphosphate ($LiAg(PO_3)_2$).

Glasses according to the present invention may advantageously be melted down also from a mixture which consists of 5.0 to 99.5 %, by weight, of at least one fluoride and 95.0 to 0.5 %, by weight, of at least one metaphosphate. In this connection the fluorides can be replaced partially or entirely by at least one hydrogen fluoride or a complex inorganic fluoride. In addition, this mixture may also contain up to 3.0 %, by weight, of sodium nitrate $NaNO_3$.

Another advantageous process of producing a glass according to the present invention is characterized by melting down a mixture consisting of 0.0001 to 15.0 % by weight, of silver metaphosphate $AgPO_3$ and an amount of at least one fluoride which makes up the mixture to 100 %, by weight. The mixture may also consist of 0.001 % to 10.0 %, by weight, of silver metaphosphate $AgPO_3$ and an amount of at least one fluoride sufficient to make up the mixture to 100 %, by weight.

It is furthermore of advantage to provide a mixture which consists of 0.1 to 1.0 %, by weight, of silver metaphosphate $AgPO_3$ and 99.0 to 99.9 %, by weight, of at least one fluoride. Such a mixture may additionally contain mono- and/or bi- and/or trivalent metal metaphosphates.

One particular advantageous embodiment of the process of producing a dosimeter glass in accordance with the present invention is characterized by melting together a mixture which contains 0.05 to 3.0 %, by weight, of silver metaphosphate $AgPO_3$; up to 49.0 %, by weight, of lithium metaphosphate $LiPO_3$; up to 57.0 %, by weight, of the alkaline earth metal metaphosphates of magnesium Mg and/or calcium Ca and/or barium Ba, the amount of magnesium metaphosphate $Mg(PO_3)_2$ being up to 21.0 %, by weight, of amount of calcium metaphosphate $Ca(PO_3)_2$ up to 14.0 %, by weight, and the amount of barium metaphosphate $Ba(PO_3)_2$ up to 36.0 %, by weight; up to 49.0 %, by weight, of aluminum metaphosphate $Al(PO_3)_3$; up to 5.0 %, by weight, of potassium hydrogen fluoride $KHF_2$; up to 48.0 %, by weight, of lithium fluoride LiF; up to 65.0 %, by weight, of alkaline earth metal fluorides such as the fluorides of beryllium Be and/or magnesium Mg and/or calcium Ca and/or strontium Sr and/or barium Ba, whereby the amount of beryllium fluoride $BeF_2$ is up to 10.0, by weight, the amount of magnesium fluoride $MgF_2$ up to 10.0%, by weight, the amount of calcium fluoride $CaF_2$ up to 31.0 %, by weight, the amount of strontium fluoride $SrF_2$ up to 11.0 %, by weight, and the amount of barium fluoride $BaF_2$ up to 15.0 %, by weight; up to 30.0 %, by weight, of aluminum fluoride $AlF_3$, and up to 5.0 %, by weight, of lanthanum fluoride $LaF_3$.

On a more detailed investigation of glass formation in the metaphosphate-fluoride system the following results are obtained: The glassiness, i.e. the reciprocal of the crystal growth rate, decreases only slightly with fluoride contents up to 20 mol%, but it decreases more strongly with higher fluoride contents. It passes through a minimum at 50 mol% of fluoride content, increases again in the region of 70 mol%, and finally decreases very strongly for fluoride contents of more than 90 mol%. This pattern of the degree of glassiness is due to the superimposition or interference of the tendency towards crystallization which increases with increasing fluoride content, and of the maximum of the tendency towards segregation at a fluoride content of 50 mol%. It has been found that glass formation can be facilitated by providing readily polarizable cations and the greatest possible number of components.

BRIEF DESCRIPTION OF THE DRAWINGS

The invention will be described more in detail hereinafter with reference to the attached drawings in which:

FIG. 3 shows build-up behavior after irradiation with 300 R of a cobalt-60 source for different fluoride contents as parameter at 20° C.;

FIG. 4 shows fading behavior of the glass 2025 at different storage temperatures;

DESCRIPTION OF THE PREFERRED EMBODIMENTS

In the attached Tables 1 and 2 there are given examples of glass mixture compositions as well as certain dosimeter properties of the RPL dosimeter glasses melted down from such mixtures.

As predose indicated in Roentgen (R), there is designated the $\gamma$-dose of a cobalt-60 source with which a glass must be irradiated in order to double the luminescence intensity present prior to irradiation.

The absolute sensitivity depends on the overall evaluation system. Therefore, it is indicated in relative units for the following investigations. From the examples of these Tables it will be seen that it is possible to replace, within wide limits, the metaphosphate group by fluorides. Even fluorine glasses which contain only a very minor amount of metaphosphates still show the effect of radio-photoluminescence.

In order to develop RPL glasses of low energy dependence it is advisable to use preferably fluorides of a low nuclear charge number and to select the composition in such a manner as to obtain glasses which are resistant to weathering.

In Table 2 there are given other examples of glass mixture compositions in which certain dosimeter properties such as the predose, the sensitivity, and in addition the energy dependence, i.e. the ratio of the luminescence intensity at 40 keV to the luminescence intensity at 1 MeV, are given.

As is evident from these Tables, the theoretically optimum value 1 for the energy dependence is practically achieved, within the limits of error, by Melt No. 2026 in Table 2.

In attached Tables 3 and 4, the glass mixture components set forth in Tables 1 and 2 —namely the metal metaphosphates and the sodium nitrate — have been split up into oxidic components and phosphorus pentoxide $P_2O_5$ and nitrogen pentoxide $N_2O_5$.

In addition thereto there have also been indicated the molar ratio of the fluoride components to the phosphate components and the weight ratio of the fluoride components to the phosphate components.

Figure 1:
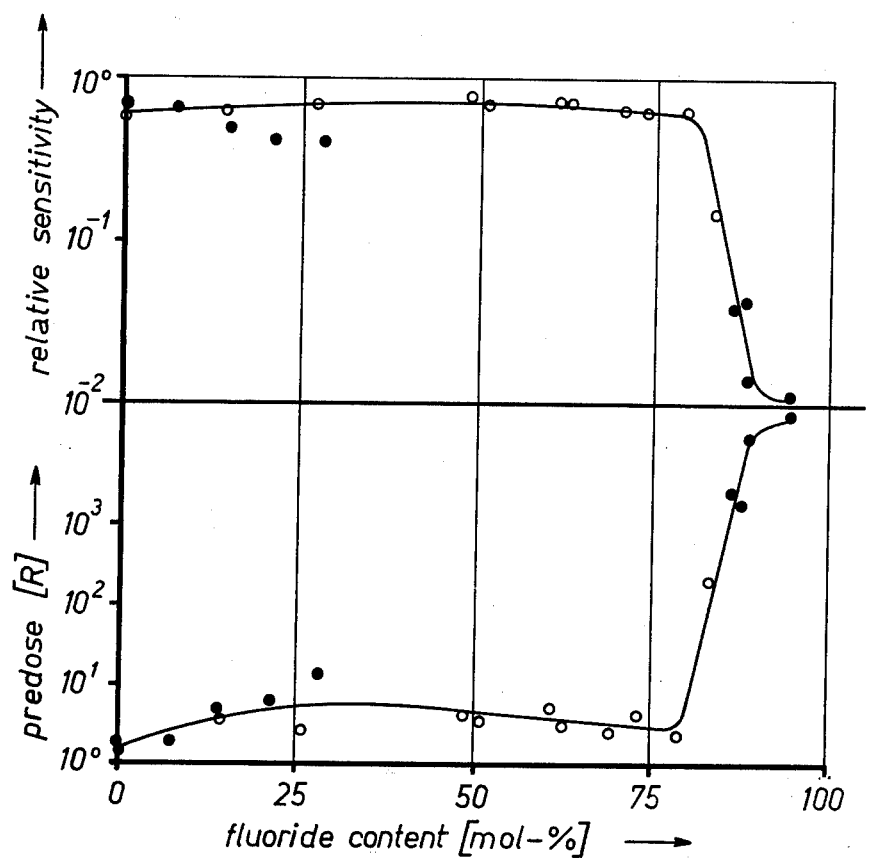
FIG. 1 shows predose and sensitivity as a function of the fluoride content.

FIG. 1 of the attached drawings shows in its upper part the sensitivity of an RPL glass according to the present invention as a function of the fluoride content. The sensitivity increases slightly up to about 50 mol% of fluoride and then decreases slightly from 50 mol% to 80 mol%; for higher fluoride contents, it decreases much more strongly.

In the lower part of FIG. 1, the predose is shown as a function of the fluoride content. At a content of about 35 mol% of fluoride, the predose shows a first maximum, and at 75 mol% a minimum. This course of the curve is explained by the maximum of the tendency towards segregation at 50 mol% and by the strongly decreasing solubility of the silver with high fluoride contents. The black circles indicate melts of Table 1 and the unfilled circles melts of Table 2.

Figure 2:
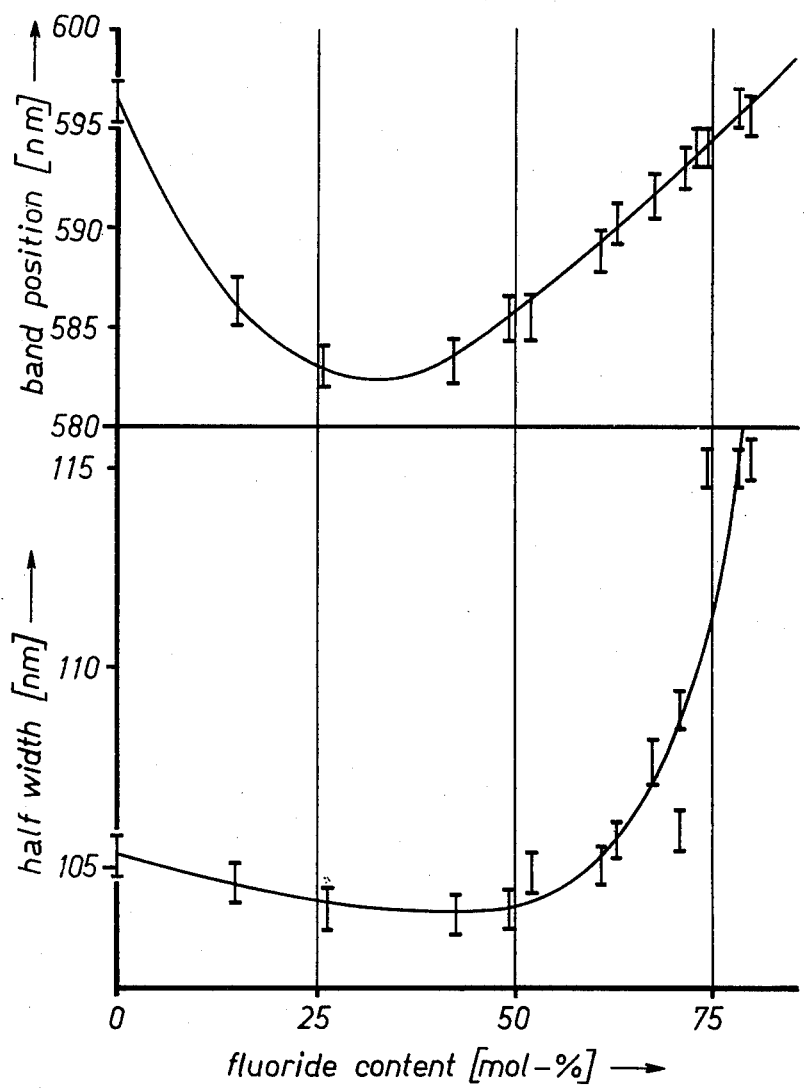
FIG. 2 shows band position and half-width value of the luminescence bands produced by irradiation, at half of its maximum intensity as a function of the fluoride content.

In the upper part of FIG. 2 there is shown the band position of the bands in nm. as a function of the fluoride content. It passes through a minimum at about 45 mol% of fluoride. In the lower part of FIG. 2 there is indicated the halfwidth of the luminescence band produced by irradiation with cobalt-60 as a function of the fluoride content. FIG. 2 illustrates melts of Tables 1 and 2.

The half-width depends on the environmental symmetry and the possible energy positions of the center. An increase in the fluoride content creates new possibilities of incorporation of the center, leads to new energy positions, and thus to an increase in the half-width of the band. In the region of 45 mol% of fluoride, structures of a higher order are formed due to the higher tendency towards segregation, and as a result thereof the environmental symmetry of the center increases, while due to said increase the band half-width decreases. The superimposition of these opposite effects leads to the formation of a minimum in the lower part of FIG. 2. Displacement of the band position towards smaller wave lengths means, in accordance with the ligand field theory, a decrease in the interaction of the center with its environment. The possibility of radiation-free energy transfer decreases. In agreement therewith, FIG. 1 shows that the luminescence yield — i.e., the sensitivity — has a maximum at about 50 mol% of fluoride.

The reason for this is the more self-contained glass structure of higher order at 50 mol% of fluoride, as a result of which the centers are isolated in the glass structure.

In FIG. 3 there is shown the build-up behavior of the RPL dosimeter glasses of the present invention containing a percentage of silver phosphate $AgPO_3$ of 0.5 mol% for different fluoride contents between 0 mol% and 86.1 mol%. It is clearly evident that the RPL kinetics slows down with an increase in the fluoride content. The fact that an increasing fluoride content leads to a more rigid glass network is a known fact in glass technology. When recalling that diffusion processes are necessary for the development of the RPL centers, it explains the laws governing the RPL kinetics. This represents another advantage of the RPL glasses according to the present invention with respect to integrating dosimetry. The slow RPL kinetics prevents fading phenomena even at higher temperatures. FIG. 3 illustrates melts of Table. 1.

This becomes clearly evident from FIG. 4 in which the fading behavior at different storage temperatures between 20° C. and 250° C. is shown for a glass with melt No. 2025 as given in Table 2. Up to a temperature of about 100° C., substantially no fading occurs. In contrast thereto, the known metaphosphate glasses show a considerably higher fading when stored at the same temperatures.

Figure 5:
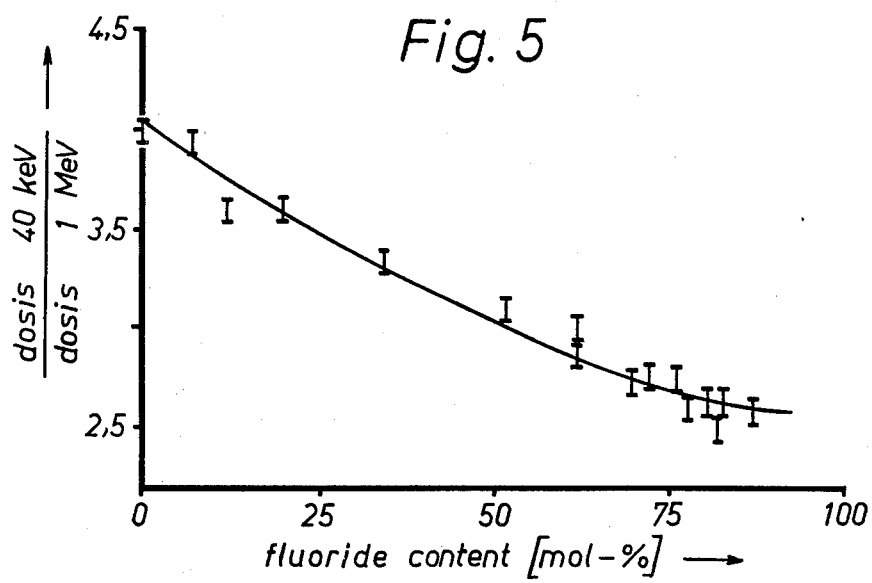
FIG. 5 shows maximum energy dependence as a function of the fluoride content.

FIG. 5 shows the energy dependence, i.e., the ratio of the dose indication at 40 keV to the dose indication at 1 MeV, for a silver phosphate $AgPO_3$ concentration of 0.5 mol% as parameter as a function of the fluoride content. The energy dependence decreases with increase in the fluoride content, since with the same cation upon replacement of the metaphosphate group by fluorine, the means nuclear charge number decreases. As long as an upper limit of the fluoride content which is dependent on the composition of the cations is not exceeded, the RPL glasses of the present invention have, for the same silver concentration, a higher sensitivity and a lower energy dependence than a pure metaphosphate glass. A decrease in the activator concentration leads — as in all previously known dosimeter glasses — to a lower sensitivity. In the RPL dosimeter glasses of the present invention it is possible, however, — as shown by Melt No. 2026 in Table 2 — to obtain, with relatively high sensitivity, practically complete absence of dependence of the dose indication on the γ-energy.

Figure 6:
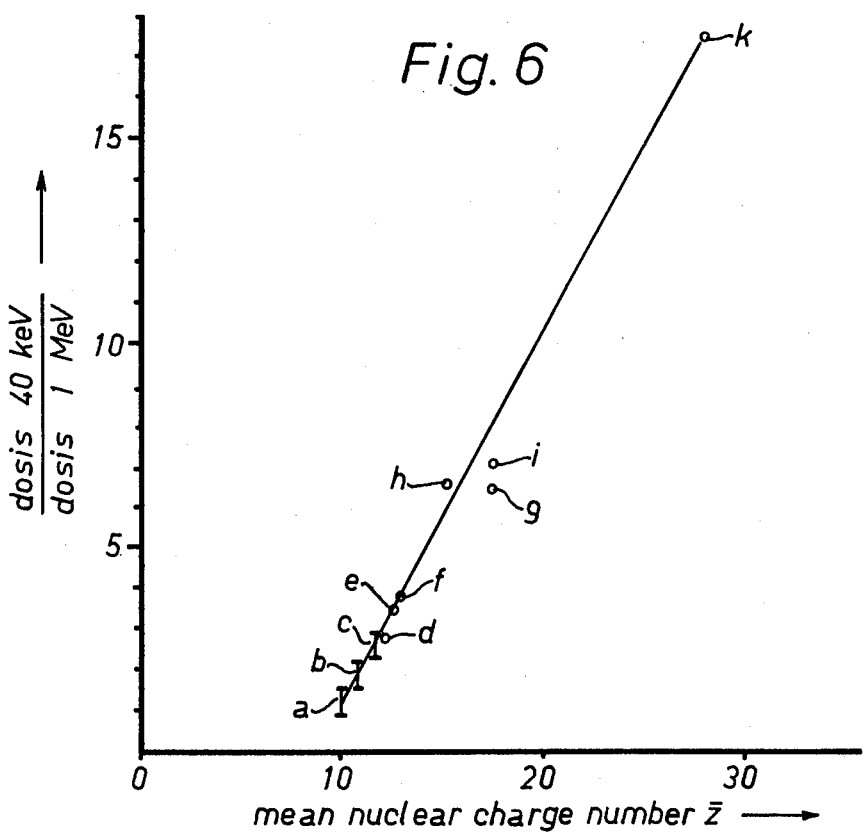
FIG. 6 shows energy dependence of different known RPL dosimeter glasses as a function of the average nuclear charge number.

In FIG. 6 there is shown the energy dependence of previously known RPL dosimeter glasses as a function of the mean nuclear charge number $\overline{Z}$. For $\overline{Z}$ the following mathematical relationship applies:

$$\overline{Z} = \sqrt[3]{\frac{\sum_i x_i \cdot Z_i^4}{\sum_i x_i \cdot Z_i}}$$

In said formula:
$\overline{Z}$ indicates the mean nuclear charge number;
$Z_i$ indicates the nuclear charge number of the element $i$;
$x_i$ indicates the molar fraction of the element $i$;

In FIG. 6, the letters a to k stand for the following RPL dosimeter glasses:

| Letter | Designation of the RPL glass | Literatur |
|---|---|---|
| a to c | Glasses of the present invention | The present application |
| d | "Toshiba FD 7" | R.Yokota and Y.Muto: "Health Physics" vol. 20(1971), p. 662 |
| e | "Becker-Schott" | K.Becker: "Nuclear Instruments and Methods" vol. 36, (1965), p. 323 |
| f | "Toshiba FD 5" | R.Yokota and Y.Muto: "Health Physics" vol. 20 (1971) p. 662 |
| g | "Toshiba FD 3" | K.Becker: "Nuclear Instruments and Methods" vol.36 (1965), p. 323 |
| h | "CEC" | US Patent No. 3,294,700 |
| i | "Low-Z" | R.J. Ginther and J.H. Schulmann: "Nucleonics" vol. 18 (1960) p. 94 |
| k | "High-Z" | R.J. Ginther and J.H. Schulman: "Nucleonics" vol. 18 (1960) p.94 |

The composition of the tested glasses is given in Table 5 on page 26.

As can be seen, the RPL dosimeter glasses a to c of the present invention are distinguished by their low mean nuclear charge numbers which lie between 10 and 12 and their lower dependence on energy over the known glasses indicated by letters d to k. For low silver contents, the energy dependence become negligible small.

In order to compare the weathering resistance of the RPL dosimeter glasses of the present invention with that of known glasses, experiments were carried out in accordance with a weathering test usually employed in the optical industry. Such as test is described in the "Glass Catalog 3050" of the firm Schott & Gen. of Mainz, Germany, dated October 1966 on page III-3. The tested glasses are subjected in accordance therewith to a periodically varying steam atmosphere. The following three glasses were examined:

a. Glass of Becker (U.S. Pat. No. 3,554,920) having a base of lithium borate of the formula $Li_2O.4\ B_2O_3$;

b. "Toshiba FD-7" glass corresponding to the glass indicated by the letter $d$ in FIG. 6;

c. Glass No. 2025 in accordance with Table 2 of the present invention.

The surfaces of said three glasses of low energy dependence exhibited after weathering the following changes:

Glass (a): Very strong surface attack.
Glass (b): Pronounced corrosion.
Glass (c): Scarcely detectable traces of an attack of its surface.

The glass of the present invention, therefore, has a surprisingly superior resistance to corrosion. Further tests show an increasing improvement in the resistance to weathering with an increase in the aluminum fluoride/lithium fluoride $AlF_3/LiF$ ratio.

In addition to the glass base, the activator concentration is also of controlling influence on the dosimetric properties. To prove this, the silver concentration was varied in an RPL glass of the present invention. The basic glass mixture had the following composition:

26.0 %, by weight, of lithium fluoride, LiF,
9.0 %, by weight, of aluminum flouride, $AlF_3$,
40.0 %, by weight, of aluminum metaphosphate, $Al(PO_3)_3$, and
25.0 %, by weight, of lithium metaphosphate, $LiPO_3$.

This glass has a specific gravity of 2.42 g./cc., a coefficient of expansion of $17.8 \cdot 10^{-6}\ °C.^{-1}$, a transformation temperature of 321° C., and an Abbe number of 73.3. As a result of the small index of refraction $n_e = 1.4993$, only slight losses in reflection occur on evaluating the dose indication. The resistance to weathering is equivalent to that of optical glasses of the FK type (fluor crown glass type).

Figure 7:
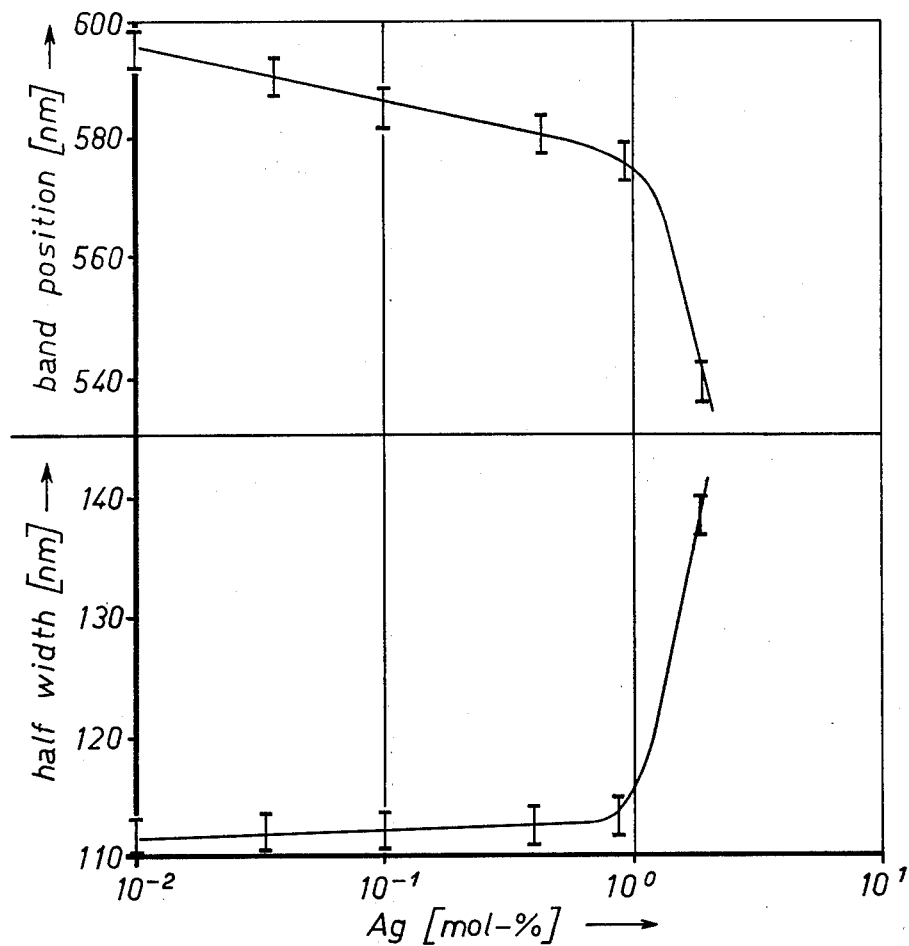
FIG. 7 shows position and half-width value of the luminescence bands produced upon irradiation with cobalt-60 as a function of the silver content.

The upper part of FIG. 7 shows the position and its lower part the half-width of the luminescence band as it is obtained after irradiation with cobalt-60 as a function of the silver content. UV excitation was effected at 385 nm. With an increase in the silver content, the band maximum shifts towards shorter wave lengths and the half-width increases.

Figure 8:
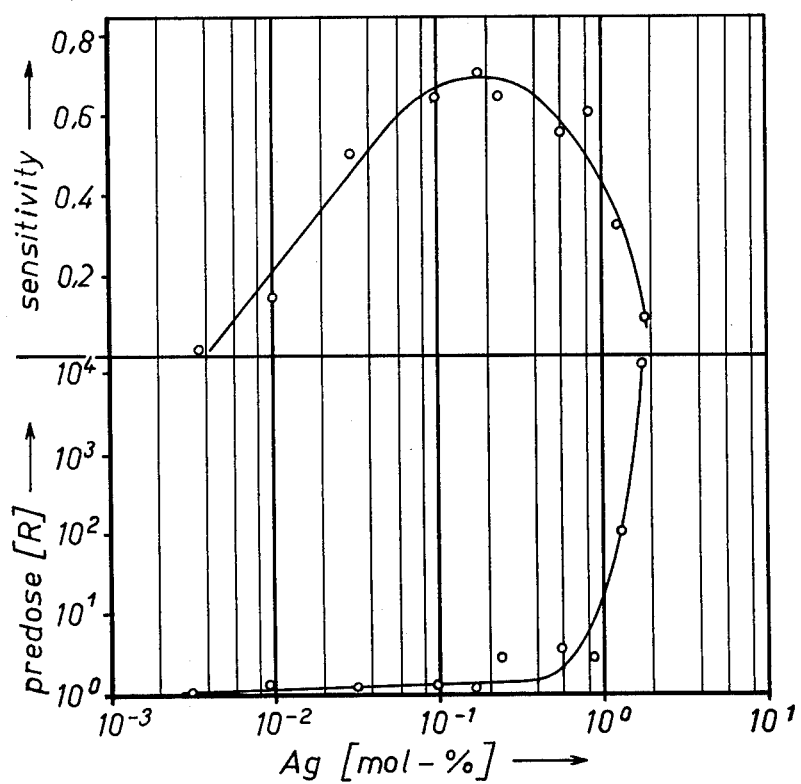
FIG. 8 shows predose and sensitivity as a function of the silver content.

The predose is plotted in the lower part of FIG. 8 and the sensitivity in its upper part, in each case as a function of the silver content. The sensitivity passes through a maximum, while the predose increases initially only slightly, but subsequently very substantially.

Figure 9:
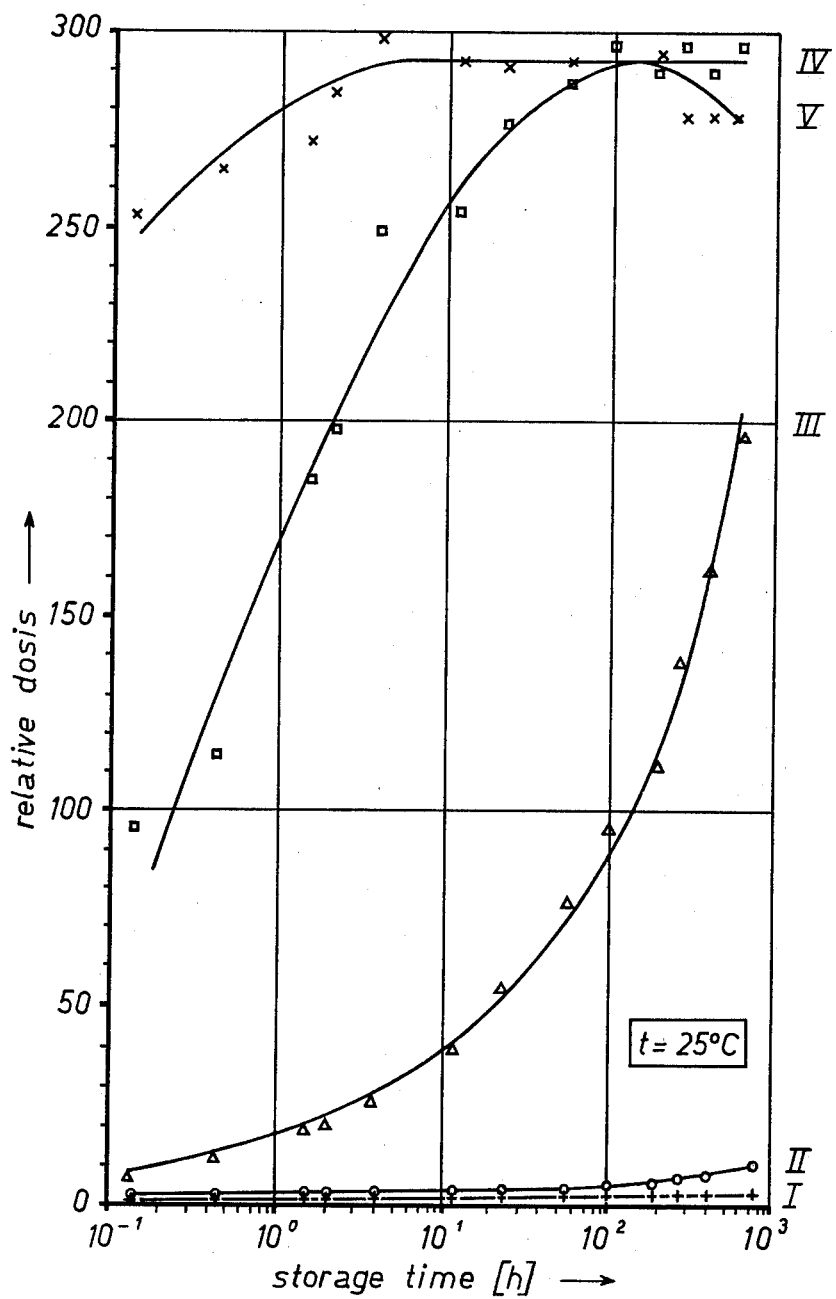
FIG. 9 shows build-up behavior at room temperature for different silver contents.
Figure 10:
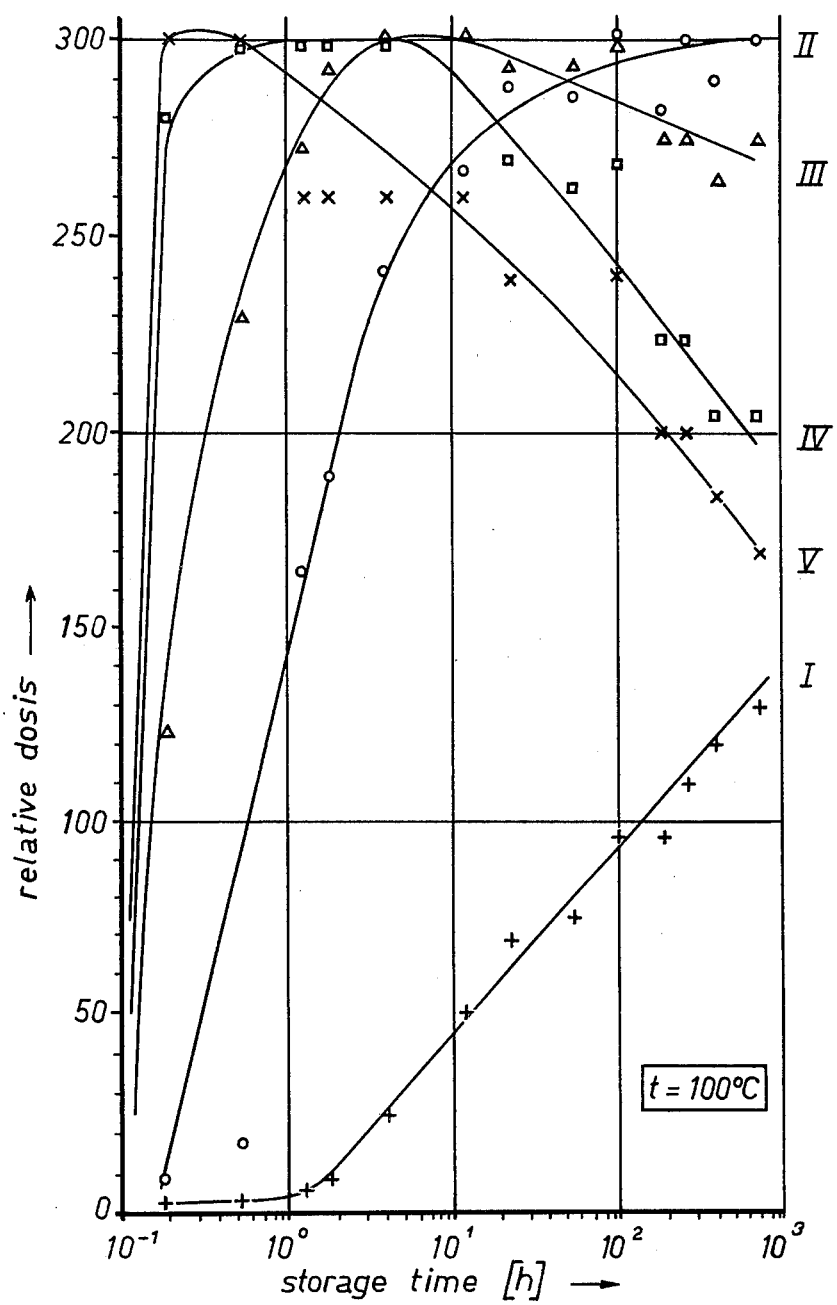
FIG. 10 shows build-up behavior at 100° C. for different silver contents.

FIG. 9 shows the build-up behavior at a temperature of 25° C. and FIG. 10 to the build-up behavior at a temperature of 100° C., in each case for different silver contents. In this connection the glasses represented by curves I to V have the following silver contents:

| Symbol | Curve | Mol% of Silver |
|---|---|---|
| + | I | 0.0033 |
| O | II | 0.033 |
| △ | III | 0.17 |
| □ | IV | 0.6 |
| × | V | 1.2 |

Figure 11:
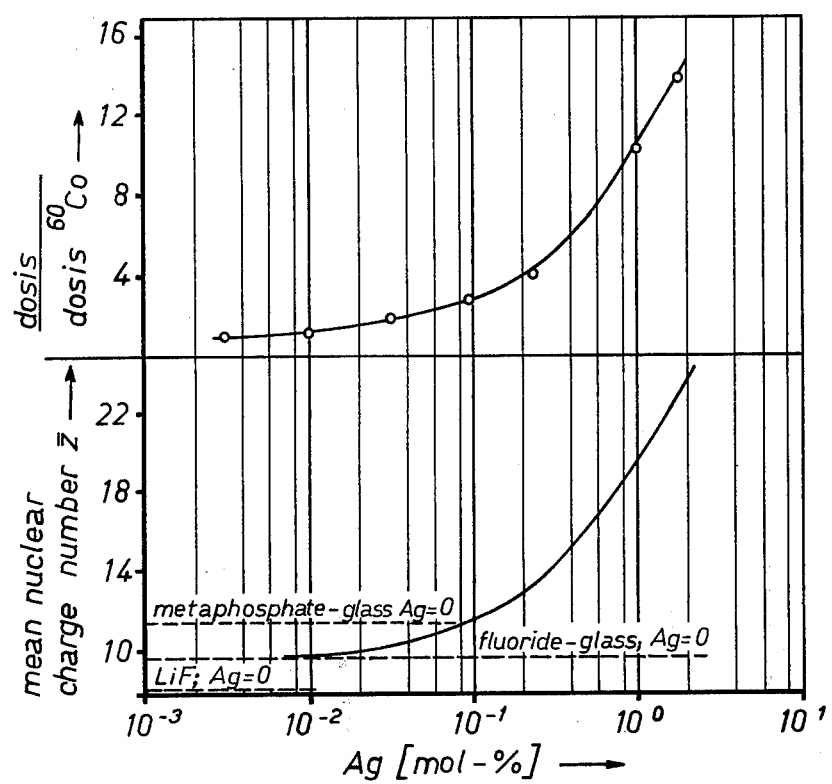
FIG. 11 shows maximum energy dependence and mean nuclear charge number as a function of the silver content.

The upper part of FIG. 11 shows the maximum energy dependence and the lower part the mean nuclear charge number Z as a function of the silver content. In this connection there have also been entered in horizontal dashed lines the mean nuclear charge numbers of non-activated lithium fluoride LiF and of non-activated metaphosphate glass as compared with a non-activated fluoride glass.

The fading was also determined for different silver contents at different temperatures, namely at 25° C., 100° C., and 200° C., as a function of the storage time. Thereby a high stability of the dose indication was found.

The glasses of the present invention are produced by melting down the mixture of the respective components which should be as pure as possible in a covered quartz crucible in a weakly oxidizing atmosphere in an electric furnace. Melting time and melting temperature are reduced with increasing fluoride content. While pure metaphosphate glass requires 40 minutes to melt at 1380° C., 5 minutes at 1300° C. is sufficient for a glass consisting of 30 mol% of fluoride components and 5 minutes at 1100° C. is sufficient for a glass consisting of 70 mol% of fluoride components. The low viscosity and the low surface tension of fluoride-containing melts facilitate homogenizing of the glass melt. This is a great advantage in the production of the fluoride-containing RPL dosimeter glasses over the known glasses. The costs of manufacture are comparatively low due to the short melting times and the relatively low melting temperature; due to the good homogeneity of the melt, continuous agitation is also unnecessary, so that the possible introduction of additional impurities is excluded. Due to the short melting time and the low melting temperature of glasses of high fluorine content, contamination by the material of the melting crucible and by the environment causing increase in the predose, is relatively small. The casting or molding plate temperature also decreases with an increase in the fluorine content.

If the glasses are not cast in the cubic shapes, they are cut into cubic shape after pre-annealing them at 280° C. to 450° C. in a similar manner as this is done in the manufacture of optical glasses. The surfaces of the glasses are then ground and polished. The dosimetric properties of the RPL dosimeter glasses thus obtained can then be determined, after irradiation with a cobalt-60 source, by means of a dosimeter evaluator.

It is within the scope of the present invention to add oxidic additives, for instance, lithium oxide $Li_2O$, beryllium oxide BeO, and boron trioxide $B_2O_3$ in an amount of a few percent to the melt mixture for glass technological reasons. The use of other crucible materials in place of quartz and the use of other types of furnaces in place of an electric furnace is also within the scope of the present invention.

The novel improved RPL dosimeter glasses according to the present invention have proved to be useful, for instance, in high-dose-level emergency, such as military or Civil Defense dosimetry, in routine low-level and accident high-level dosimetry in nuclear installations, for the measurement of low energy X-rays in medical installations, and for other purposes for which the known RPL dosimeter glasses are used. Such uses are described, for instance, by Klaus Becker in "Health Physics" vol. 14, pages 29–31 (1968).

Table 1

| Melt No. | 1640 1644 | 1641 1645 | 1642 1646 | 1643 | 1659 | 1660 | 1652 | 1653 | 1654 |
|---|---|---|---|---|---|---|---|---|---|
| (in % by weight) | | | | | | | | | |
| $AgPO_3$ | 2.5 | 2.5 | 2.5 | 2.5 | 1.5 | 1.5 | 2.5 | 1.5 | 0.5 |
| $LiPO_3$ | 45.0 | 42.5 | 40.0 | 37.5 | 1.5 | 1.5 | 5.5 | — | — |
| $Mg(PO_3)_2$ | — | — | — | — | 10.0 | 10.0 | 10.0 | 20.9 | — |
| $Ca(PO_3)_2$ | — | — | — | — | 14.0 | 14.0 | 14.0 | — | — |
| $Ba(PO_3)_2$ | — | — | — | — | — | — | — | 35.4 | — |
| $Al(PO_3)_3$ | 47.5 | 45.0 | 42.5 | 40.0 | — | — | — | — | — |
| $KHF_2$ | — | — | — | — | — | 5.0 | — | — | — |
| $MgF_2$ | 1.0 | 2.0 | 3.0 | 4.0 | 6.0 | 6.0 | 6.0 | 8.4 | 10.0 |
| $CaF_2$ | 1.0 | 2.0 | 3.0 | 4.0 | 31.0 | 31.0 | 29.0 | 8.6 | 30.0 |
| $SrF_2$ | 1.0 | 2.0 | 3.0 | 4.0 | 11.0 | 11.0 | 10.0 | 8.5 | 10.0 |
| $BaF_2$ | 1.0 | 2.0 | 3.0 | 4.0 | — | — | — | 8.4 | 14.5 |
| $AlF_3$ | 1.0 | 2.0 | 3.0 | 4.0 | 25.0 | 20.0 | 23.0 | 7.2 | 30.0 |
| $LaF_3$ | — | — | — | — | — | — | — | 1.1 | 5.0 |
| Predose (R) | 1.8 | 4.2 | 5.8 | 13.0 | 1730 | 1130 | 930 | 40 | $3 \cdot 10^4$ |
| Sensitivity (relative units) | 0.67 | 0.48 | 0.42 | 0.25 | 0.05 | 0.07 | 0.08 | 0.1 | 0.001 |

Table 2

(in % weight)

| Melt No.: | 1822 1823 | 1824 1825 | 1826 1827 1828 | 1829 | 1830 | 1832 | 1833 | 1834 | 1835 1837 2024 | 1836 | 1840 | 1841 | 2025 | 2026 |
|---|---|---|---|---|---|---|---|---|---|---|---|---|---|---|
| $AgPO_3$ | 0.5 | 0.5 | 0.5 | 0.5 | 0.5 | 0.5 | 0.5 | 0.5 | 0.5 | 0.5 | 0.5 | 0.5 | 0.16 | 0.05 |
| $LiPO_3$ | 48.5 | 33.5 | 18.5 | 0.5 | 38.5 | 43.5 | 33.5 | 28.5 | 23.5 | 18.5 | 28.5 | 18.5 | 23.84 | 23.95 |
| $Al(PO_3)_3$ | 39.0 | 49.0 | 49.0 | 49.0 | 44.0 | 44.0 | 44.0 | 42.5 | 40.0 | 36.0 | 44.0 | 39.0 | 40.0 | 40.0 |
| LiF | — | 15.0 | 30.0 | 48.0 | 10.0 | 5.0 | 15.0 | 20.0 | 25.0 | 30.0 | 20.0 | 30.0 | 25.0 | 25.0 |
| $BeF_2$ | — | — | — | — | — | — | — | — | — | — | 5.0 | 10.0 | — | — |
| $AlF_3$ | 10.0 | — | — | — | 5.0 | 5.0 | 5.0 | 7.0 | 9.0 | 13.0 | — | — | 9.0 | 9.0 |
| $NaNO_3$ | 2.0 | 2.0 | 2.0 | 2.0 | 2.0 | 2.0 | 2.0 | 2.0 | 2.0 | 2.0 | 2.0 | 2.0 | 2.0 | 2.0 |
| Predose (R) | 4.6 | 3.4 | 2.8 | 2.2 | 2.3 | 2.6 | 3.1 | 2.8 | 1.7 | 1.6 | 5.5 | 3.5 | 1.6 | 1.5 |
| Sensivity (relative units) | 0.59 | 0.79 | 0.64 | 0.62 | 0.68 | 0.66 | 0.67 | 0.67 | 0.73 | 0.66 | 0.68 | 0.66 | 0.51 | 0.28 |
| Energy dependence | 2.65 | 3.58 | 2.57 | 2.40 | 2.90 | 2.85 | 2.80 | 2.70 | 2.58 | 2.50 | 2.64 | 2.44 | 1.8 | 1.1 |

Table 3

(in % by weight)

| Melt No. | 1640 1644 | 1641 1645 | 1642 1646 | 1643 | 1659 | 1660 | 1652 | 1653 | 1654 |
|---|---|---|---|---|---|---|---|---|---|
| $Ag_2O$ | 1.60 | 1.60 | 1.60 | 1.60 | 0.93 | 0.93 | 1.60 | 0.93 | 0.31 |
| $Li_2O$ | 7.90 | 7.40 | 7.00 | 6.60 | 0.26 | 0.26 | 0.95 | — | — |
| MgO | — | — | — | — | 1.40 | 1.40 | 1.40 | 2.90 | — |
| CaO | — | — | — | — | 3.95 | 3.95 | 3.95 | — | — |
| BaO | — | — | — | — | — | — | — | 18.35 | — |
| $Al_2O_3$ | 9.10 | 8.60 | 8.10 | 7.70 | — | — | — | — | — |
| $P_2O_5$ | 76.40 | 72.40 | 68.30 | 64.10 | 20.46 | 20.46 | 24.10 | 35.62 | 0.19 |
| $KHF_2$ | — | — | — | — | — | 5.00 | — | — | — |
| $MgF_2$ | 1.00 | 2.00 | 3.00 | 4.00 | 6.00 | 6.00 | 6.00 | 8.40 | 10.00 |
| $CaF_2$ | 1.00 | 2.00 | 3.00 | 4.00 | 31.00 | 31.00 | 29.00 | 8.60 | 30.00 |
| $SrF_2$ | 1.00 | 2.00 | 3.00 | 4.00 | 11.00 | 11.00 | 10.00 | 8.50 | 10.00 |
| $BaF_2$ | 1.00 | 2.00 | 3.00 | 4.00 | — | — | — | 8.40 | 14.50 |
| $AlF_3$ | 1.00 | 2.00 | 3.00 | 4.00 | 25.00 | 20.00 | 23.00 | 7.20 | 30.00 |
| $LaF_3$ | — | — | — | — | — | — | — | 1.10 | 5.00 |
| Mol% F / Mol% P | 0.08 | 0.17 | 0.27 | 0.36 | 6.2 | 6.2 | 4.6 | 1.9 | 338 |
| Weight % F / Weight % P | 0.05 | 0.11 | 0.18 | 0.25 | 2.7 | 2.7 | 2.1 | 0.73 | 194 |

Table 4

(in % by weight)

| Melt No. | 1822 1823 | 1824 1825 | 1826 1827 1828 | 1829 | 1830 | 1832 | 1833 | 1834 | 1835 1837 2024 | 1836 | 1840 | 1841 | 2025 | 2026 |
|---|---|---|---|---|---|---|---|---|---|---|---|---|---|---|
| $Ag_2O$ | 0.31 | 0.31 | 0.31 | 0.31 | 0.31 | 0.31 | 0.31 | 0.31 | 0.31 | 0.31 | 0.31 | 0.31 | 0.10 | 0.03 |
| $Li_2O$ | 8.50 | 5.90 | 3.25 | 0.09 | 6.80 | 7.60 | 5.90 | 5.00 | 4.10 | 3.25 | 5.00 | 3.25 | 4.19 | 4.20 |
| $Al_2O_3$ | 7.50 | 9.40 | 9.40 | 9.40 | 8.40 | 8.40 | 8.40 | 8.00 | 7.60 | 6.90 | 8.40 | 7.50 | 7.60 | 7.60 |
| $Na_2O$ | 0.73 | 0.73 | 0.73 | 0.73 | 0.73 | 0.73 | 0.73 | 0.73 | 0.73 | 0.73 | 0.73 | 0.73 | 0.73 | 0.73 |
| $P_2O_5$ | 71.69 | 67.39 | 55.04 | 40.20 | 67.49 | 71.69 | 63.39 | 57.69 | 51.99 | 44.54 | 59.29 | 46.94 | 52.11 | 52.17 |
| $N_2O_5$ | 1.27 | 1.27 | 1.27 | 1.27 | 1.27 | 1.27 | 1.27 | 1.27 | 1.27 | 1.27 | 1.27 | 1.27 | 1.27 | 1.27 |
| LiF | — | 15.00 | 30.00 | 48.00 | 10.00 | 5.00 | 15.00 | 20.00 | 25.00 | 30.00 | 20.00 | 30.00 | 25.00 | 25.00 |
| $BeF_2$ | — | — | — | — | — | — | — | — | — | — | 5.00 | 10.00 | — | — |
| $AlF_3$ | 10.00 | — | — | — | 5.00 | 5.00 | 5.00 | 7.00 | 9.00 | 13.00 | — | — | 9.00 | 9.00 |
| Mol% F / Mol% P | 0.19 | 0.97 | 2.74 | 8.6 | 0.7 | 0.36 | 1.2 | 1.7 | 2.4 | 3.5 | 2.8 | 3.5 | 2.4 | 2.4 |
| Weight % F / Weight % P | 0.11 | 0.18 | 0.44 | 0.96 | 0.18 | 0.11 | 0.26 | 0.38 | 0.53 | 0.78 | 0.34 | 0.69 | 0.53 | 0.53 |

Table 5

(in % by weight)

| Glass | Designation | Ag | Al | Li | Na | P | O | Others |
|---|---|---|---|---|---|---|---|---|
| d | Toshiba FD 7 | 0.17 | 6.12 | — | 11.0 | 31.55 | 51.16 | — |
| e | Becker-Schott | 0.60 | 0.50 | 7.30 | — | 34.70 | 55.90 | 1.00 B |
| f | Toshiba FD 5 | 0.52 | 6.08 | — | 8.93 | 33.13 | 51.34 | — |
| g | Toshiba FD 3 | 4.20 | 4.60 | 3.60 | — | 33.30 | 53.50 | 0.80 B |
| h | CEC | 2.40 | 3.50 | 2.50 | 4.70 | 33.80 | 52.50 | 0.50 Be |
| i | Low-Z | 4.30 | 4.70 | 1.90 | — | 33.70 | 52.30 | 3.10 Mg |
| k | High-Z | 4.30 | 4.70 | — | — | 28.40 | 44.10 | 10.80 Ba; 7.70 K |

The glasses a, b and c of FIG. 6 correspond to glasses Melt No. 1841; Melt No. 2025; and Melt No. 2026 of Table 2.

We claim:

1. A radio-photoluminescence dosimeter glass of low dependence on energy, consisting essentially of an inorganic silver compound and at least one metal fluoride selected from the group consisting of an alkali metal, alkaline earth metal, lanthanum, and aluminum.

2. A radio-photoluminescence dosimeter glass of low dependence on energy, consisting essentially of an inorganic silver compound and at least one inorganic complex metal fluoride.

3. The glass of claim 1, additionally containing at least one metal oxide selected from the group consisting of an alkali metal, alkaline earth metal, and aluminum, and phosphorus pentoxide.

4. The glass of Claim 1, additionally containing nitrogen pentoxide.

5. The glass of claim 3, additionally containing nitrogen pentoxide.

6. The glass of claim 1, consisting of 0.0001 to 15.0 %, by weight, of silver oxide $Ag_2O$ and a corresponding weight equivalent amount of phosphorus pentoxide $P_2O_5$ calculated for the compound silver metaphosphate $AgPO_3$ and an amount of at least one metal fluoride so as to make 100 %, by weight.

7. The glass of claim 1, consisting of 0.001 to 10.0 %, by weight, of silver oxide $Ag_2O$ and a corresponding weight equivalent amount of phosphorus pentoxide $P_2O_5$ calculated for the compound silver metaphosphate $AgPO_3$ and an amount of at least one metal fluoride so as to make 100 %, by weight.

8. The glass of claim 1, consisting of 0.01 % to 2.0 %, by weight, of silver oxide $Ag_2O$ and a corresponding weight equivalent amount of phosphorus pentoxide $P_2O_5$ calculated for the compound silver metaphosphate $AgPO_3$ and an amount of at least one metal fluoride so as to make 100 %, by weight.

9. The glass according to claim 5, in which the metal oxide content is between 2.0 and 25.0 %, by weight, and the phosphorus pentoxide content is between 15.0 and 80.0 %, by weight.

10. The glass according to claim 1, additionally containing 0.5 to 5.0 %, by weight, of nitrogen pentoxide $N_2O_5$.

11. The glass of claim 6, additionally containing 2 to 25 %, by weight, of a metal oxide selected from the group consisting of an alkali metal, alkaline earth metal, and aluminum, 15 to 80 %, by weight, of phosphorus pentoxide, and 0.5 to 5.0 %, by weight, of nitrogen pentoxide.

12. The glass of claim 1, consisting of 0.02 to 1.7 %, by weight, of silver oxide $Ag_2O$, 0.01 to 1.0 %, by weight of phosphorus pentoxide $P_2O_5$, and 5.0 to 99.5 %, by weight, of at least one of the metal fluorides of claim 1.

13. The glass of claim 12, additionally containing 5.0 % to 25.0 %, by weight, of a metal oxide selected from the group consisting of an alkali metal, alkaline earth metal, and aluminum and up to 77.0 %, by weight, of phosphorus pentoxide $P_2O_5$.

14. The glass of claim 13, additionally containing 1.0 to 2.0 %, by weight, of nitrogen pentoxide $N_2O_5$.

15. The glass according to claim 12, additionally containing at least one of the following metal oxides in the amounts given:

up to 10.0 %, by weight, of an alkali metal oxide,
up to 22.0 %, by weight, of an alkaline earth metal oxide, and
up to 10.0 %, by weight, of aluminum oxide.

16. The glass of claim 15, containing at least one of the following alkali metal oxides in the amounts given:

up to 1.0 %, by weight, of sodium oxide $Na_2O$ and
up to 9.0 %, by weight, of lithium oxide $Li_2O$.

17. The glass of claim 15, containing at least one of the following alkaline earth metal oxides in the amounts given:

up to 3.0 %, by weight, of magnesium oxide MgO and
up to 4.0 %, by weight, of calcium oxide CaO.

18. The glass of claim 15, containing at least one of the following alkaline earth metal oxides in the amounts given:

up to 3.0 %, by weight, of magnesium oxide MgO and
up to 22.0 %, by weight, of barium oxide BaO.

19. The glass of claim 15, containing aluminum oxide $Al_2O_3$ in an amount not exceeding 10.0 %, by weight.

20. The glass of claim 12, in which the fluoride is present in an amount of at least 5 % and up to 50.0 %, by weight, of an alkali metal fluoride,
up to 65.0 %, by weight, of an alkaline earth metal fluoride, and
up to 35.0 %, by weight, of aluminum or lanthanum fluoride.

21. The glass of claim 12, in which the fluoride is present in an amount of at least 5 % and
up to 50.0 %, by weight, of an alkali metal fluoride.

22. The glass of claim 12, in which the fluoride is present in an amount of at least 5 % and
up to 65.0 %, by weight, of an alkaline earth metal fluoride.

23. The glass of claim 12, in which the fluoride is present in an amount of at least 5 % and
up to 35.0 %, by weight, of aluminum or lanthanum fluoride.

24. The glass of claim 21, in which the alkali metal fluoride is present in an amount of at least 5 % and up to 49.0 %, by weight, of lithium flouride LiF and
up to 5.0 %, by weight, of potassium fluoride KF.

25. The glass of claim 22, in which the alkaline earth metal fluoride is present in an amount of at least 5 % and up to 10.0 %, by weight, of beryllium fluoride $BeF_2$,
up to 10.0 %, by weight, of magnesium fluoride $MgF_2$,
up to 32.0 %, by weight, of calcium fluoride $CaF_2$,
up to 12.0 %, by weight, of strontium fluoride $SrF_2$, and
up to 15.0 %, by weight, of barium fluoride $BaF_2$.

26. The glass of claim 23, in which at least one of the aluminum and lanthanum fluorides is present in an amount of at least 5 % and
 up to 6.0 %, by weight, of lanthanum fluoride $LaF_3$ and
 up to 31.0 %, by weight, of aluminum fluoride $AlF_3$.

27. A radio-photoluminescence dosimeter glass of low dependence on energy, said glass essentially consisting of
 a silver compound selected from the group consisting of silver metaphosphate, silver nitrate, silver carbonate, and silver lithium metaphosphate, and
 a metal fluoride selected from the group consisting of an alkali metal fluoride, and alkaline earth metal fluoride, aluminum fluoride, lanthanum fluoride, the hydrogen fluorides of said metals, and the inorganic complex fluorides thereof,
the fluoride content of said glass being at least about 5 %, by weight, and
the silver oxide content of said glass being between about 0.0001 and about 15.0 %, by weight.

28. A radio-photoluminescence dosimeter glass of low dependence on energy, said glass essentially consisting of
 a silver compound selected from the group consisting of silver metaphosphate, silver nitrate, silver carbonate, and silver lithium metaphosphate,
 a metal fluoride selected from the group consisting of an alkali metal fluoride, an alkaline earth metal fluoride, aluminum fluoride, lanthanum fluoride, the hydrogen fluorides of said metals, and the inorganic complex fluorides thereof, and
 a metal metaphosphate selected from the group consisting of an alkali metal metaphosphate, an alkaline earth metal metaphosphate and aluminum metaphosphate,
 the fluoride content of said glass being at least about 5 %, by weight,
the silver oxide content of said glass being between 0.0001 % and 15.0 %, by weight, and
the metaphosphate content including the silver metaphosphate content of said glass being between 95.0 % and 0.5 %, by weight.

* * * * *

UNITED STATES PATENT OFFICE
CERTIFICATE OF CORRECTION

Patent No. 3,930,873　　　　　　Dated January 6, 1976

Inventor(s) Hans-Herbert Kaes and Hans Staaden

It is certified that error appears in the above-identified patent and that said Letters Patent are hereby corrected as shown below:

Column 4, line 13: "of" first occurrence, should read --the--

Column 6, line 66: "means" should read -- mean --.

Column 7, line 53: "on page 26" should be cancelled.

line 59: "negligible" should read -- negligibly --.

Column 15, line 15: "and" should read -- an --.

Signed and Sealed this sixth Day of April 1976

[SEAL]

Attest:

RUTH C. MASON
Attesting Officer

C. MARSHALL DANN
Commissioner of Patents and Trademarks